United States Patent [19]

Heinsius et al.

[11] Patent Number: 4,785,544

[45] Date of Patent: Nov. 22, 1988

[54] SPIRIT LEVEL ACCESSORY FOR THE ELECTRIC DRILL

[76] Inventors: Robert Heinsius, George Spector 233 Broadway RM 3815; George Spector, 233 Broadway RM 3815, both of New York, N.Y. 10007

[21] Appl. No.: 150,842

[22] Filed: Feb. 1, 1988

[51] Int. Cl.[4] .......................... B23B 45/14; G01C 9/28

[52] U.S. Cl. ........................................ 33/334; 33/372; 33/390

[58] Field of Search ................. 33/334, 370, 371, 372, 33/373, 390, 381; 408/716

[56] References Cited

U.S. PATENT DOCUMENTS

| | | | |
|---|---|---|---|
| 2,756,512 | 7/1956 | Pettit | 33/372 |
| 3,664,032 | 5/1972 | Tomdkins | 33/334 |
| 4,457,078 | 7/1984 | Suchy | 33/334 |

*Primary Examiner*—Harry N. Haroian

[57] ABSTRACT

A spirit level accessory for an electric drill is provided and consists of a clamp member to fit on mounting surface of the electric drill, a dial member mounted on the clamp member and adjustable to obtain correct position with respect to center line of the electric drill, a bracket member held at any desired angle to the dial member by a spring force, a spirit level member held by the bracket member and a cover member having a mirrored inside surface and hinged on the spirit level member to protect the spirit level member against damage when not in use, allowing the spirit level member to be viewed when fully opened and viewed from the mirrored inside surface when halfway opened.

4 Claims, 1 Drawing Sheet

SPIRIT LEVEL ACCESSORY FOR THE ELECTRIC DRILL

BACKGROUND OF THE INVENTION

The instant invention relates generally to leveling devices and more specifically it relates to a spirit level accessory for an electric drill.

Numerous leveling devices have been provided in prior art that are adapted to level the working axis of various hand tools. For example, U.S. Pat. Nos. 4,295,279; 4,457,078 and 4,4546,549 all are illustrative of such prior art. While these units may be suitable for the particular purpose to which they address, they would not be as suitable for the purposes of the present invention as heretofore described.

SUMMARY OF THE INVENTION

A primary object of the present invention is to provide a spirit level accessory for an electric drill that will overcome the shortcomings of the prior art devices.

Another object is to provide a spirit level accessory for an electric drill in which a person can hold the electric drill by hand under the desired angle to drill a hole.

An additional object is to provide a spirit level accessory for an electric drill in which a person is able to drill by hand a number of holes parallel with the electric drill.

A further object is to provide a spirit level accessory for an electric drill that is simple and easy to use.

A still further object is to provide a spirit level accessory for an electric drill that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 5 is a perspective view of a drill with the invention installed for drilling a hole vertically up, such as in a ceiling or the like.

FIG. 6 is a perspective view of the drill with the invention installed for drilling a hole in a vertical surface, such as in a wall or the like.

FIG. 7 is a perspective view of the drill with the invention installed for drilling a hole vertically down, such as in a floor or the like.

DETAILED DESCRIPTION OF THE PREFERRED EMBODIMENTS

Figure 1:
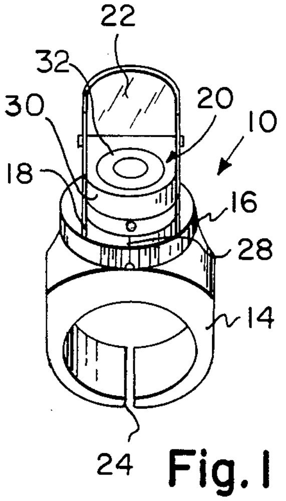
FIG. 1 is a perspective view of the invention with cover member opened.
Figure 2:
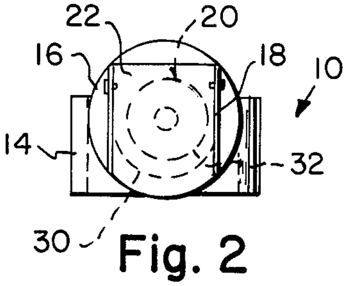
FIG. 2 is a top view with cover member closed
Figure 2A:
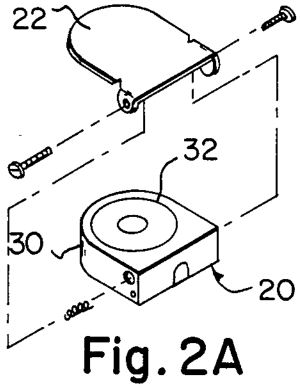
FIG. 2A is an exploded perspective view of the cover member hinge.
Figure 3:
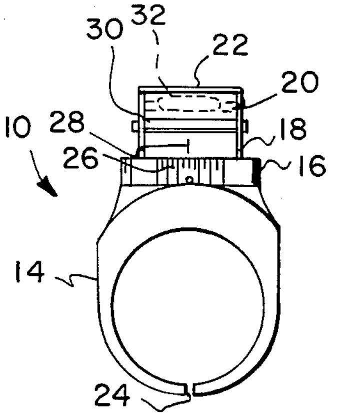
FIG. 3 is a front view thereof.
Figure 4:
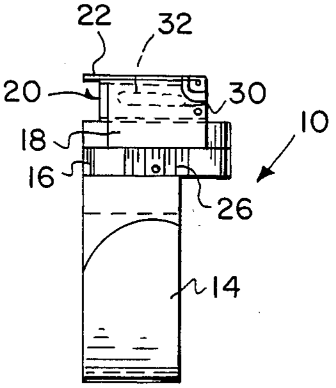
FIG. 4 is a side view thereof.

Turning now descriptively to the drawings, in which similar reference characters denote similar elements throughout the several views, FIGS. 1 through 7 illustrate a spirit level accessory 10 for an electric drill 12 and consists of a clamp member 14, a dial member 16, a bracket member 18, a spirit level member 20 and a cover member 22. The clamp member 14 has a gap 24, which fits on standard mounting surface of the electric drill 12, whereby a clamping force is obtained by deformation of the clamp member 14 nearby the gap 24. The dial member 16 has four sixty degree graduation scales 26.

The dial member 16 is mounted on the clamp member 14 and is adjustable a few degrees and set, by a screw (not shown), to obtain a correct position with respect to axis of the electric drill 12. The bracket member 18 has an indicator mark 28 thereon. The bracket member 18 and the dial member 16 are held together by a spring force for friction therebetween by a flanged stud (not shown) and a corrugated ring (not shown). Between the bracket member 18 and the dial member 16 a felt friction plate (not shown) is mounted. The indicator mark 28 of the bracket member 18 can be set at any desired angle shown on the dial member 16. The bracket member 18 can also contain a spring forced lock (not shown) and two adjusting screws (not shown) to obtain a backlash free hinge and an exact swing angle of ninety degrees of the spirit level member 20. The spirit level member 20 is held by the bracket member 18.

The cover member 22 has its inside surface highly polished to function as a mirror. The cover member 22 is hinged on the spirit level member 20 to protect the spirit level member against damage when not in use. The cover member 22 can be opened fully at ninety degrees allowing the spirit level member 20 to be viewed directly. The cover member 22 can be opened halfway at forty five degrees allowing the spirit level member 20 to be viewed indirectly at the inside surface of the cover member.

The spirit level member 20 includes a round type body 30 so that the spirit level member can indicate the horizontal level in all directions. The spirit level member further includes a level liquid holder 32 with top as well as bottom being convex so that the spirit level member 20 can also be used upside down.

Figure 5:
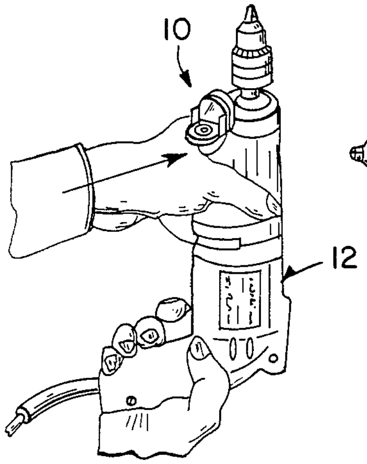

FIG. 5 shows the position of the spirit level accessory 10 when the electric drill 12 is drilling a hole vertically up, such as in a ceiling. The spirit level member 20 can be viewed via the highly polished inside surface of the cover member 22 which functions like a mirror. The cover member 22 is set at approximately forty five degrees with respect to the spirit level member 20.

Figure 6:
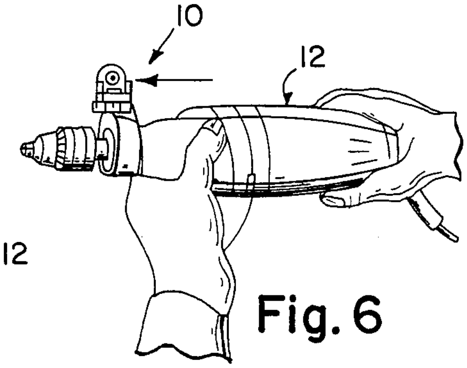

FIG. 6 shows the position of the spirit level accessory 10 when the electric drill 12 is drilling a hole square in a vertical surface, such as a wall or a side of a workpiece. When surface to be drilled is out of plumb the spirit level accessory 10 can be set to correct this to obtain a hole square in this surface.

Figure 7:
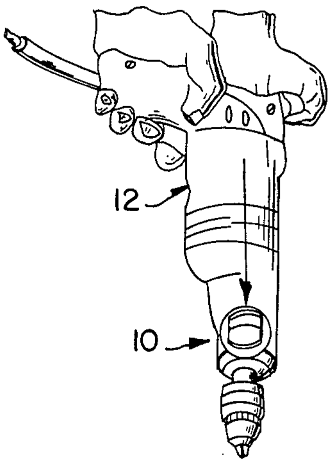

FIG. 7 shows the position of the spirit level accessory 10 when the electric drill 12 is drilling a hole vertical down, such as a floor or when building a frame construction.

If there is a situation in which the spirit level member 20 can't be viewed easily, for example, when a hole must be drilled in a corner of a room parallel with one of the walls and close to the ceiling, the accessory 10 must be turned one hundred and eightly degrees around the drill mounting surface and the spirit level member 20 also turned on hundred and eighty degrees.

Figure 8:
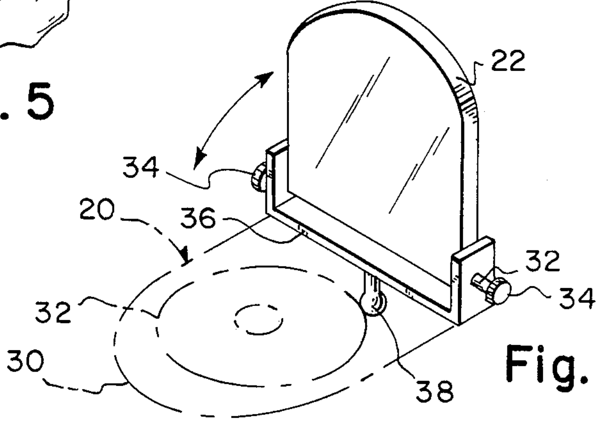
FIG. 8 is a perspective view of a modified cover member that is hinged to a U-shaped frame member that has a ball and socket universal joint in the spirit level member so that the cover member can be more adjustable with respect to the spirit level member.

FIG. 8 shows a modification in which the cover member 22 is hinged with a pair of stub shafts 32 and adjustment knobs 34 to a U-shaped frame member 36 centrally attached to a ball and socket universal joint 38 in the spirit level member 20 so that the cover member 22 can be more adjustable with respect to the spirit level member 20.

The clamp member 14 is made of aluminum or a hard plastic material. The dial member 16, the bracket member 18 and the spirit level member 20 are all made of Perspex (acrilic) transparent hard plastic material. The cover member 22 is made of stainless steel, sanded on the outside surface and highly polished on the inside surface stud and adjusting screws (not shown) are made of steel and plated. The friction plate (not shown) is made of felt while the corrugated ring (not shown) is a standard commercial part.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A spirit level accessory for an electric drill which comprises:

(a) a clamp member having a gap which fits on standard mounting surface of the electric drill, whereby a clamping force is obtained by deformation of said clamp member nearby the gap;

(b) a dial member having four sixty degree graduation scales, said dial member mounted on said clamp member and is adjustable few degrees and set to obtain a correct position with respect to axis of the electric drill;

(c) a bracket member having an indicator mark thereon, said bracket member and said dial member held together by a spring force for friction therebetween, whereby the indicator mark of said bracket member can be set at any desired angle shown on said dial member; and (d) a spirit level member held by said bracket member;

(e) a cover member having its inside surface highly polished to function as a mirror, said cover member hinged on said spirit level member to protect said spirit level member against damage when not in use, said cover member can be opened fully at ninety degrees allowing said spirit level member to be viewed directly and said cover member can be opened half way at forty five degrees allowing said spirit level member to be viewed indirectly at the inside surface of said cover member.

2. A spirit level accessory as recited in claim 1, wherein said spirit level member includes a round type body so that said spirit level member can indicate the horizontal level in all directions.

3. A spirit level accessory as recited in claim 2, wherein said spirit level member further includes a level liquid holder with top as well as bottom being convex so that said spirit level member can also be used upside down.

4. A spirit level accessory as recited in claim 3, wherein said cover member is hinged with a pair of stub shafts and adjustment knobs to a U-shaped frame member centrally attached to a ball and socket universal joint in said spirit level memer so that said cover member can be more adjustable with respect to said spirit level member.

* * * * *